United States Patent [19]
Altermatt

[11] 4,009,158
[45] Feb. 22, 1977

[54] MIXTURES OF AZO COMPOUNDS HAVING A 2-NITRO-4-PHENYLSULFAMOYLDIPHENYL AMINE NUCLEUS

[75] Inventor: Ruedi Altermatt, Tecknau, Switzerland

[73] Assignee: Sandoz Ltd., Basel, Switzerland

[22] Filed: Jan. 3, 1975

[21] Appl. No.: 538,397

Related U.S. Application Data

[60] Division of Ser. No. 204,382, Dec. 2, 1971, Pat. No. 3,865,805, which is a continuation of Ser. No. 851,444, Aug. 19, 1969, abandoned.

[30] Foreign Application Priority Data

Aug. 30, 1968 Switzerland ............... 13051/68
Dec. 19, 1968 Switzerland ............... 18944/68
Dec. 19, 1968 Switzerland ............... 18943/68

[52] U.S. Cl. .................... 260/205; 8/26; 260/196; 260/206; 260/207; 260/207.1; 260/207.5
[51] Int. Cl.² .......................... C09B 43/00
[58] Field of Search ......... 260/196, 205, 206, 207, 260/207.1, 207.5; 8/26

[56] References Cited
UNITED STATES PATENTS

| | | | |
|---|---|---|---|
| 2,879,269 | 3/1959 | Merian | 260/205 X |
| 3,516,982 | 6/1970 | Dimroth et al. | 260/206 |
| 3,535,306 | 10/1970 | Altermatt et al. | 260/207.1 |
| 3,663,531 | 5/1972 | Liechti | 260/207 X |

FOREIGN PATENTS OR APPLICATIONS 345,096  4/1960  Switzerland ............... 260/205

*Primary Examiner*—Charles F. Warren
*Attorney, Agent, or Firm*—Gerald D. Sharkin; Richard E. Vila; Melvyn M. Kassenoff

[57] ABSTRACT

Compounds of the formula

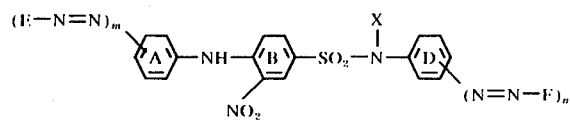

and mixtures thereof, wherein
E is phenyl, substituted phenyl, naphthyl, methylsulfonylnaphthyl, thiazolyl, substituted thiazolyl, benzothiazolyl, substituted benzothiazolyl, pyrazolyl, substituted pyrazolyl, 4-carbamoylimidazolyl, 4-phenyl-1,3,5-thiadiazolyl, thienyl, quinolyl or tetrazolyl,
F is phenyl, naphthyl, thiazolyl, benzothiazolyl, pyrazolyl, imidazolyl, thiadiazolyl, thienyl, quinolyl, tetrazolyl or 1-anilino-1,3-dioxobutyryl-2, or a substituted derivative thereof,
X is hydrogen, alkyl or substituted alkyl,
$m$ is 0 or 1, and
$n$ is 0 or 1,
with the proviso that $m + n$ is 1 or 2, and wherein Rings A, B and D may bear additional substituents.

These compounds are outstandingly suitable for dyeing and printing fibres consisting of synthetic or semi-synthetic, hydrophobic organic compounds of high molecular weight and textile materials manufactured with these fibres.

8 Claims, No Drawings

MIXTURES OF AZO COMPOUNDS HAVING A 2-NITRO-4-PHENYLSULFAMOYLDIPHENYL AMINE NUCLEUS

This application is a division of application Ser. No. 204,382, filed Dec. 2, 1971, and now U.S. Pat. No. 3,865,805, which is a continuation of application Ser. No. 851,444, filed Aug. 19, 1969, and now abandoned.

The new compounds have the general formula

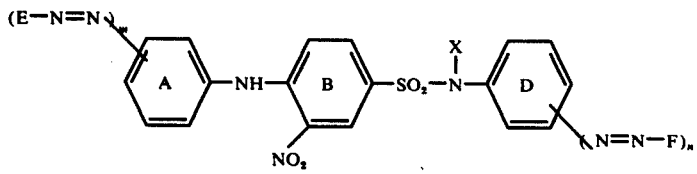

(I)

where
E stands for a phenyl radical which may be substituted by chlorine or bromine atoms, lower alkyl, lower alkoxy, trifluoromethyl, nitro, cyano, thiocyano, phenoxy, formyl, acetyl, benzoyl, lower alkylsulphonyl, lower hydroxyalkylsulphonyl, benzylsulphonyl, aminosulfonyl (sulfamoyl), methylaminosulfonyl (methylsulfamoyl), cyanoethylaminosulfonyl (cyanoethylsulfamoyl), N-hydroxyethylaminosulfonyl (N-hydroxyethylsulfamoyl), phenylaminosulfonyl (phenylsulfamoyl), formylamino (formamido) lower alkanoylamino, chloropropionylamino, (chloropropionamido) lower alkylsulphonylamino, lower alkoxycarbonyl, benzyloxycarbonyl, lower alkoxycarbonylamino, aminocarbonyl (carbamoyl), lower alkylaminocarbonyl (alkylcarbamoyl) or phenylaminocarbonyl (phenylcarbamoyl) groups; a naphthalene radical which may be substituted by a methylsulphonyl group; a thiazole radical which may be substituted by chlorine or bromine atoms, methyl, methoxy, nitro, methylsulphonyl or trifluoromethyl groups; a benzothiazole radical which may be substituted by chlorine or bromine atoms, nitro, cyano, methylsulphonyl, methoxy, trifluoromethyl, aminosulphonyl, lower alkylaminosulphonyl, hydroxyethylaminosulphonyl or a methoxypropylaminosulphonyl group: a pyrazole radical which may be substituted by methyl, benzyl or phenyl groups; a 4-aminocarbonylimidazole radical: a 4-phenylthiadiazole-(1,3,5) radical; a thiophene radical, a quinoline radical or a tetrazole radical:

F for a phenyl radical which may be substituted by chlorine or bromine atoms, lower alkyl, lower alkoxy, phenoxy, trifluoromethyl, thiocyano, cyano, nitro, hydroxyl, formyl, acetyl, benzoyl, lower alkylsulphonyl. hydroxyethylsulphonyl, benzylsulphonyl, aminosulphonyl, lower alkylaminosulphonyl, cyanoethylsulfamoyl hydroxyethylaminosulphonyl, phenylaminosulphonyl, lower alkylamino, cyanothylamino, formylamino, lower alkanoylamino, chloropropionylamino, methylsulphonylamino, lower alkoxycarbonyl, benzyloxycarbonyl, lower alkoxycarbonylamino, aminocarbonyl, lower alkylaminocarbonyl or phenylaminocarbonyl groups; a naphthalene radical which may be substituted by a methylsulphonyl group; a benzothiazole radical which may be substituted by chlorine or bromine atoms or a nitro, cyano, methylsulphonyl, methoxy, trifluoromethyl, aminosulphonyl, methylaminosulphonyl, ethylaminosulphonyl, hydroxyethylaminosulphonyl or methoxypropylaminosulphonyl group: a pyrazole radical which may be substituted by lower alkyl, hydroxyl, amino, carboxylic acid amide or phenyl groups: a 4-aminocarbonylimidazole radical; a 4-phenylthiadiazole-(1,3,5) radical; a thiophene radical; a quinoline radical; a hydroxyquinoline radical, a tetrazole radical or an acetoacetic acid anilide radical:

X for a hydrogen atom or a lower alkyl group which may be substituted by chlorine or bromine atoms, hydroxyl, cyano, lower alkanoyloxy, benzoyloxy, lower alkoxycarbonyloxy, lower alkoxycarbonyl, aminocarbonyl, benzyloxycarbonyloxy, lower alkphenyl, cyandethylamino, sulphonyl, hydroxyethylaminosulphonyl, phenylaminosulphonyl, formylamino, lower alkanoylamino, chloropropionylamino, lower alkylsulphonylamino, lower alkoxycarbonyl, benzyloxycarbonyl, lower alkoxycarbonylamino, aminocarbonyl, lower alkylaminocarbonyl or phenylaminocarbonyl groups; a naphthalene radical which may be substituted by a methylsulphonyl group: a thiazole radical which may be substituted by chlorine or bromine atoms, methyl, methoxy, nitro, methylsulphonyl or trifluoromethyl groups; a benzothiazole radical which may be substituted by chlorine or bromine atoms, or a nitro, cyano, methylsulphonyl, methoxy, trifluoromethyl, aminosulphonyl, lower alkylaminosulphonyl, hydroxyethylaminosulphonyl or a methoxypropylaminosulphonyl group: a pyrazole radical which may be substituted by methyl, benzyl or phenyl groups; a 4-aminocarbonylimidazole radical, a 4-phenylthiadiazole-(1,3,5)-radical, a thiophene radical, a quinoline radical or a tetrazole radical:

F for a phenyl, naphthyl, thiazolyl, benzothiazolyl, pyrazolyl, imidazolyl, thiadiazolyl, thienyl, quinolyl, tetrazolyl or acetoacetic acid anilide radical which may be substituted:

X for a hydrogen atom or an optionally substituted alkyl group;

m for 0 or 1, and and
n for 0 or 1, where the sum of m and n is at least 1: and where the rings A, B and D may bear further substituents and the molecule is free from sulphonic acid groups.

In the preferred dyestuffs of formula (I), the symbols have the following meanings:

E stands for a phenyl radical which may be substituted by chlorine or bromine atoms, lower alkyl, lower alkoxy, trifluoromethyl, nitro, cyano, thiocyano, phenoxy, formyl, acetyl, benzoyl, lower alkylsulphonyl, lower hydroxyalkylsulphonyl, benzylsulphonyl, aminosulfonyl (sulfamoyl), meoxy, phenoxy, pyridyl, methylaminocarbonyloxy (methylcarbamoyloxy) or phenylaminocarbonyloxy (phenylcarbamoyloxy) groups:

m for 0 to 1, and n for 0 or 1, where the sum of m and n is at least 1: the ring A may bear as substituents chlorine or bromine atoms, lower alkyl, lower alkoxy, formylamino, lower alkanoylamino, benzoylamino, lower alkoxycarbonylamino, benzyloxycarbonylamino or chloropropionylamino groups; the ring B may bear a further nitro group: the ring D may bear chlorine or bromine atoms, lower alkyl, lower alkoxy, phenoxy, hydroxyl, cyano, nitro, thiocyano, hydroxyethoxy, lower alkanoyloxyethoxy, formylamino, lower alkanoylamino, benzoylamino, lower alkylsulphonyl, benzylsulphonyl, phenylsulphonyl, aminosulphonyl, lower alkylaminosulphonyl, acetyl, benzoyl, aminocarbonyl, lower alkylaminocarbonyl, methoxypropylaminocarbonyl groups or a group of the formula

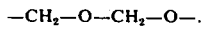

The term "lower" indicates that the respective groups contain 1, 2, 3 or 4 carbon atoms.

The azo compounds of formula (I) are produced by condensation of one mole of a compound of the formula

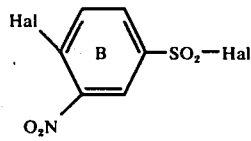

where Hal represents a chlorine or bromine atom, with one mole of an amine of the formula

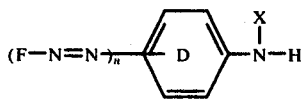

and one mole of an amine of the formula

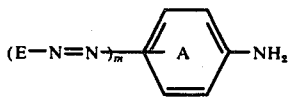

The condensation reaction is generally conducted in an inert solvent, e.g. water, ethanol, n-butanol, benzyl alcohol, ethylene glycol, polyethylene glycol, benzene, toluene, xylene, chlorobenzene etc., at temperatures in the range of 25° C to 200° C. It is usually advantageous to include an acid-binding agent in the reaction mixture, e.g. alkali, carbonates, bicarbonates or acetates, magnesium oxide or calcium oxide.

Since the halogen atom attached to the SO$_2$ group in the compound of formula (II) is more highly reactive than the halogen atom bound to the nucleus, the first noted amine of formula (III) is bound to the SO$_2$- group while the amine of formula (IV) is subsequently bound directly to the nucleus B. It is desirable to effect the first stage of the reaction at a temperature below 100° C and the second stage in the range of about 80° C to 200° C, employing an autoclave if necessary.

A second mode of operation for producing compounds of formula (I) is to melt one mole of a compound of the formula

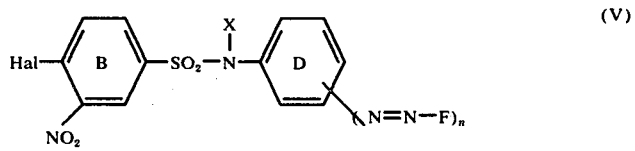

and one mole of an amine of formula (IV) and to condense the two in the presence of one of the aforenamed acid-binding agents at a suitable temperature between 100° C and 220° C.

A further synthetic route to compounds of formula (I) consists in condensing one mole of a compound of the formula

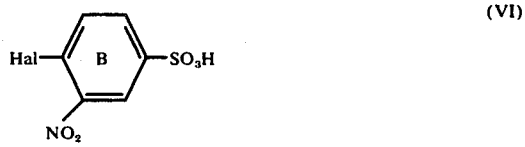

and one mole of an amine of formula (IV), converting the resulting compound with a halogenating agent, e.g. phosphorus trichloride or thionyl chloride, into the sulphonic acid chloride of the formula

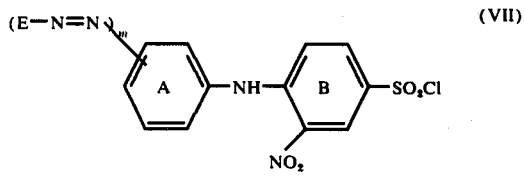

and condensing this with one mole of an amine of formula (III). Here the condensation reaction of the compound of formula (VI) with the amine of formula (IV) is carried out, preferably in one of the aforenamed solvents, at temperatures in the range of about 30° C to 200° C, whilst the condensation of the compound of formula (VII) with the amine of formula (III) is effected preferably in the same medium in the range of 25° C to 130° C.

A further method of production yielding compounds of formula (I) in which n=1 consists in the diazotization of a compound of the formula

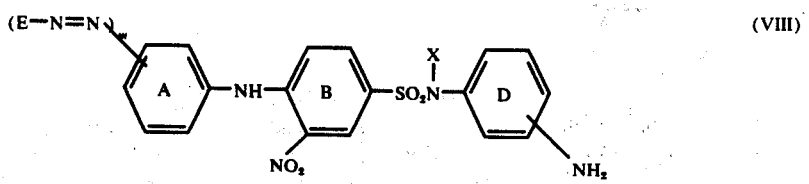 (VIII)

followed by coupling with a compound of the formula

F — H    IX

In the especially preferred dyes of formula (I) the sum of $m$ and $n$ is 1.

Mixtures of dyes of formula (I) also exhibit outstandingly good properties. These mixtures can be obtained, for example, by reacting 1 mole of a compound of the formula

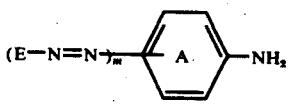

with 1 mole of a mixture of different compounds of the formula

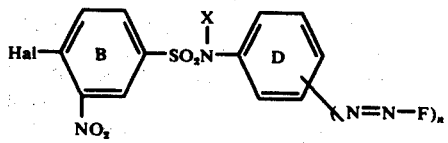

or by reacting 1 mole of a mixture of different compounds of the formula

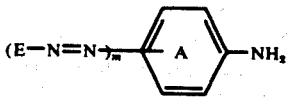

with 1 mole of a compound of the formula

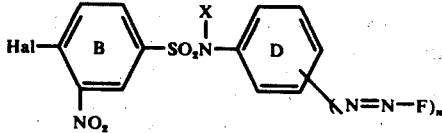

It is of great advantage to convert the new dyes into dye preparations before their application, using known methods for this purpose, e.g. grinding in the presence of dispersing agents and/or fillers, with subsequent vacuum or spray drying if dry preparations are desired. After the addition of a suitable volume of water the dyes can be applied to the substrate by exhaustion dyeing, pad dyeing or printing methods at long or short liquor ratio.

From aqueous dispersions the dyes build up excellently on textile materials consisting of synthetic or semi-synthetic organic substances of hydrophobic character and high molecular weight. They are especially suitable for dyeing and printing textiles of linear aromatic polyester fibres, cellulose diacetate, cellulose triacetate and polyamide fibres. They are also dyeable on polyolefins. The known exhaustion dyeing, pad dyeing and printing methods are employed, for example the process described in French Patent 1,445,371.

The dyeings obtained are of yellow shade and are extremely fast, showing excellent fastness to heat treatments (thermofixation, sublimation, pleating), gas fumes, cross dyeing, dry cleaning, chlorine and wet tests such as washings, water and perspiration. They are highly stable to the conditions of the pre-cure and post-cure permanent press finishing process. The dischargeability and the reserve of wool and cotton are good. Their fastness to light is outstandingly good, even in pale shades, which makes the new dyes well suitable as components for the production of fashionable pastel combination shades. At temperatures in the range of 80° C to 140° C the dyes are resistant to reduction by boiling: this stability is not adversely affected by the liquor ratio or by the presence of dyeing accelerants.

In the following Examples the parts are by weight and the temperatures in degrees centigrade.

EXAMPLE 1

A mixture of 25.6 parts of 1-chloro-2-nitrobenzene-4-sulphonic acid chloride, 19.7 parts of 4-amino-1,1'-azobenzene, 250 parts of ethylene glycol and 20 parts of anhydrous sodium acetate is raised to 50° in 30 minutes and stirred at this temperature for 2 hours. 12.8 Parts of 1-amino-4-chlorobenzene are added to the reaction mixture and the temperature is then increased over 1 hour to 150°. After stirring for 3 hours at 150°–155° the reaction mixture is allowed to cool to room temperature. Whereupon the dye settles out in crystalline form. It is filtered off, washed with a little ethanol and then with hot water, and finally dried. On synthetic fibres the dye thus obtained gives dyeings of yellow shade which have excellent fastness properties.

EXAMPLE 2

A mixture of 31.3 parts of 1-chloro-2-nitrobenzene-4-sulphonic acid phenylamide, 19.7 parts of 4-amino-1,1'-azobenzene, 80 parts of polyethylene glycol and 10 parts of anhydrous sodium acetate is raised to 160° in 30 minutes with vigorous stirring, stirred for a further 24 hours at 160°–165° and then allowed to cool to about 70°. At this temperature the reaction mixture is diluted with 100 parts of ethanol, after which 40 parts of water are added very slowly. The dye settles out and after 2 hours it is filtered off, washed with some ethanol and then with hot water, and dried. The pure dye, applied to synthetic fibres, gives reddish yellow dyeings having excellent fastness properties.

EXAMPLE 3

A mixture of 31.7 parts of the compound of the formula

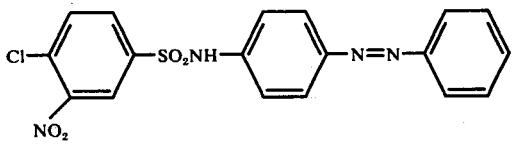

the production of which is described in Example 1, 9.3 parts of aniline, 200 parts of ethylene glycol and 10 parts of anhydrous sodium acetate is raised over 40 minutes to 145° and reacted for 2 hours at 145°–150° with stirring. After this time the mixture is allowed to cool to 20°–30°. The dye settles out in crystalline form and is filtered off, washed with some ethanol and then with hot water and subsequently dried. Yellow dyeings of excellent all-round fastness are obtained with this dye on synthetic fibre materials.

EXAMPLE 4

A mixture of 25.6 parts of 1-chloro-2-nitrobenzene-4-sulphonic acid chloride, 29.4 parts of 4-amino-1,1'-azobenzene, 250 parts of ethylene glycol and 20 parts of anhydrous sodium acetate is raised to 80° in 2 hours with thorough stirring. The temperature is held at 80° for 1 hour, then at 150° for 3 hours and subsequently at 170° for 2 hours. After this time the reaction mixture is allowed to cool to 70° and is diluted with 100 parts of ethanol. Cooling is allowed to continue and the precipitated dye is filtered off at room temperature. It is washed with ethanol and then with hot water and dried. The dye thus obtained dyes synthetic fibres in yellow shades with excellent fastness properties.

EXAMPLE 5

A mixture of 32.7 parts of 1-chloro-2-nitrobenzene-4-sulphonic acid-(3'-methyl)-phenylamide, 34.3 parts of 1-chloro-2-nitrobenzene-4-sulphonic acid-(2'-methoxy)-phenylamide, 39.4 parts of 4-amino-1,1'-azobenzene and 30 parts of anhydrous sodium acetate is brought to 170°–180° over 30 minutes, whereupon a melt is formed which is stirred for 8–12 hours at the same temperature. It is then allowed to cool to 150°, at which point 40 parts of ethylene glycol are added, and then to 90°, when 80 parts of ethanol are added, followed after a few minutes by 40 parts of water. The mixture is vigorously stirred for 1 hour at 80°, after which time the precipitated product is filtered off. The filtercake is washed with a little cold ethanol and then with ample hot water and finally dried. The dye mixture thus obtained gives dyeings of reddish yellow shade on polyester fibres which have excellent fastness properties.

EXAMPLE 6

A mixture of 31.3 parts of 1-chloro-2-nitrobenzene-4-sulphonic acid phenylamide, 34.3 parts of 1-chloro-2-nitrobenzene-4-sulphonic acid-(2'-methoxy)-phenylamide, 32.7 parts of 1-chloro-2-nitrobenzene-4-sulphonic acid-(3'-methyl)-phenylamide, 59.1 parts 4-amino-1,1'-azobenzene and 45 parts of anhydrous sodium acetate is raised to 160°–180° in 30 minutes to form a melt which is stirred for 8 to 12 hours at this temperature. It is then allowed to cool to 150°, whereupon 70 parts of ethylene glycol are added, and then further to 90°, at which point 150 parts of ethanol are added, followed after a few minutes by 70 parts of water. Vigorous stirring is maintained for 1 hour at 80° causing precipitation of the dye of mixed constitution formed by the reaction. The filtercake is washed with cold methanol and then with abundant hot water and finally dried. The dye mixture yielded by this procedure gives dyeings of reddish yellow shade on polyester fibres which have excellent all-round fastness.

EXAMPLE 7

A mixture of 37.1 parts of the compound of the formula

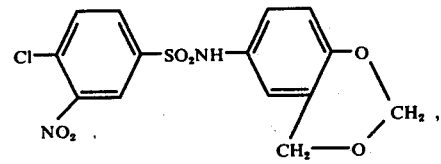

15 parts of anhydrous sodium acetate and 19.7 parts of 4-amino-1,1'-azobenzene is raised to 170° in 30 minutes and the resulting melt is stirred for 15 hours at 160°–175°. After partial cooling to 150° 20 parts of ethylene glycol are added, then cooling is continued to 90° for the addition of 50 parts of ethanol and after a few minutes 30 parts of water. The mixture is stirred thoroughly for a further hour at 80° which caused the dye to settle out. It is filtered off, washed with a little cold ethanol and then with ample hot water and finally dried. The dye thus obtained dyes synthetic fibres in reddish yellow shades which have excellent fastness properties.

EXAMPLE 8

A mixture of 32.7 parts of 1-chloro-2-nitrobenzene-4-sulphonic acid-(3'-methyl)-phenylamide, 35.5 parts of 1-chloro-2-nitrobenzene-4-sulphonic acid-N-ethyl-N-(3'-methyl)-phenylamide, 39.4 parts of 4-amino-1,1'-azobenzene and 30 parts of anhydrous sodium acetate is heated up to 170°–180° over 30 minutes to form a melt which is stirred for 8–12 hours at the same temperature. It is allowed to cool to 150°, whereupon 40 parts of ethylene glycol are added, then cooling is continued to 90°, at which point 80 parts of ethanol and after a few minutes 40 parts of water are added. The mixture is vigorously stirred for 1 hour at 80° and the precipitated product is filtered off, washed with some cold ethanol and then with ample hot water and finally dried. This procedure results in a dye mixture which gives dyeings of reddish yellow shade on polyester fibres having excellent fastness properties.

EXAMPLE 9

A mixture of 39.9 parts of 1-bromo-2-nitrobenzene-4-sulphonic acid-N-ethyl-N-(3'-methyl)-phenylamide, 19.7 parts of 4-amino-1,1'-azobenzene and 15 parts of anhydrous sodium acetate is raised to 150° in 30 minutes and the resulting melt stirred for 10 hours at 145°–150°. It is allowed to cool to 120°, whereupon 20 parts of ethylene glycol are added, and then to 90° for the addition of 40 parts of ethanol followed in a few minutes by 15 parts of water. The mixture is vigorously stirred for 2 hours at 70°–80°. The precipitated product is then filtered off, washed with some cold ethanol and then with ample hot water and dried. The dye thus obtained dye synthetic fibres in reddish yellow shades with excellent fastness properties.

EXAMPLE 10

A mixture of 32.7 parts of 1-chloro-2-nitrobenzene-4-sulphonic acid-N-methylphenylamide, 19.7 parts of 4-amino-1,1'-azobenzene, 80 parts of polyethylene glycol and 15 parts of anhydrous sodium acetate is raised to 160° in 30 minutes with vigorous stirring and stirred for 24 hours at 160°–170°. It is then allowed to cool to about 70°. At this temperature the reaction mixture is diluted with 100 parts of ethanol and after 2 hours the precipitated dye is filtered off. It is washed with a little ethanol and then with hot water and dried. The purified dye gives dyeings of reddish yellow shade on synthetic fibres showing excellent all-round fastness.

EXAMPLE 11

A mixture of 40 parts of 1-chloro-2,6-dinitrobenzene-4-sulphonic acid-N-ethyl-N-(3'-methyl)-phenylamide, 19.7 parts of 4-amino-1,1'-azobenzene, 15 parts of anhydrous sodium acetate and 200 parts of ethylene glycol is brought to 140°, stirred for 2–3 hours at 140–150 and then allowed to cool to 20°–30°. The dye, which settles out in crystalline form, is filtered off, washed with some ethanol and then with hot water and dried. On synthetic fibres the dye obtained by this procedure gives dyeings of yellow shade having outstandingly good fastness properties.

DYEING EXAMPLE 1

A mixture of 7 parts of the dye obtained as specified in Example 1, 4 parts of sodium dinaphthylmethanedisulphonate, 4 parts of sodium cetylsulphate and 5 parts of sodium sulphate is ground in a ball mill for 48 hours to give a fine powder. Two parts of the powder are dispersed in 3000 parts of water set with 3 parts of a 30% solution of a highly sulphonated castor oil and 20 parts of an emulsion of a chlorinated benzene. Into this dyebath 100 parts of a fabric of polyester fibre are entered at 20°–25°, whereupon the bath temperature is increased to 95°–100° in about 30 minutes and the fabric dyed for 1 hour at this temperature. It is then removed, washed off, soaped for 15 minutes at 70° with a 0.1% solution of an alkylphenylpolyglycol ether, rinsed and dried. A yellow dyeing having excellent fastness properties is obtained.

DYEING EXAMPLE 2

A mixture of 30 parts of the dye obtained as given in Example 2, 40 parts of sodium dinaphthylmethanedisulphonate, 50 parts of sodium cetylsulphate and 50 parts of anhydrous sodium sulphate is ground in a ball mill for 48 hours to form a fine powder. 4 Parts of this dye powder are dispersed in 1000 parts of water at 40°–50° and 100 parts of a scoured fabric of polyester fibre are entered into the bath. The bath is raised slowly to 130° and the fabric dyed for about 1 hour at this temperature under pressure. Subsequently it is washed off, soaped, rinsed and dried. The yellow dyeing produced on the polyester fabric has excellent fastness properties.

DYEING EXAMPLE 3

A fine aqueous dispersion of 30 parts of the dye mixture obtained by the procedure of Example 6, 70 parts of sodium dinaphthylmethanedisulphonate and 3 parts of sodium alginate is made up to 1000 parts with water and thoroughly mixed. This padding liquor is applied to a polyester fabric at 20° and after intermediate drying in air at 60°–100° the pad dyeing is fixed by exposure for 60 seconds in a dry air atmosphere at 230°. After fixation the fabric is rinsed, soaped, rinsed again and dried. The level yellow dyeing thus produced has good all-round fastness.

DYEING EXAMPLE 4

A mixture of 15 parts of the dye of Example 1, 20 parts of sodium dinaphthylmethanedisulphonate, 25 parts of sodium cetylsulphate and 25 parts of anhydrous sodium sulphate is ground in a ball mill for 48 hours to form a fine powder. 5 Parts of this dye preparation are dispersed in 4000 parts of water and into this bath 100 parts of a scoured fabric of cellulose triacetate fibre are entered. The bath temperature is raised slowly to 95°–100° and the fabric dyed for one hour at this temperature. On removal it is washed off, soaped for 15 minutes at 70° with a 0.1% solution of an alkylphenolpolyglycol ether, rinsed and dried. A red dyeing with good fastness properties is obtained.

DYEING EXAMPLE 5

A mixture of 7 parts of the dye of Example 7, 4 parts of sodium dinaphthylmethanedisulphonate, 4 parts of sodium cetylsulphate and 5 parts of anhydrous sodium sulphate is ground in a ball mill for 48 hours. A fine powder is formed, 2 parts of which are dispersed in 3000 parts of water containing 3 parts of a 30% solution of a highly sulphonated castor oil. At 20°–25° 100 parts of a cellulose diacetate fabric are entered, the bath is raised to 80°–82° in about 30 minutes and the fabric dyed for 1 hour at this temperature. It is then removed, washed off, soaped, rinsed and dried. A reddish yellow dyeing having good fastness properties is obtained.

DYEING EXAMPLE 6

In a ball mill a mixture of 7 parts of the dye of Example 7, 13 parts of powder from spent sulphite cellulose liquor and 100 parts of water is ground to a paste which is dried in an injection dryer. 4 Parts of the paste are dispersed in a little water and the dispersion is run through a sieve into a bath of 4000 parts of water set with 4 parts of N-oleyl-N'-hydroxyethyl-N'-(3'-sulpho-2'-hydroxypropyl)-ethylenediamine. 100 Parts of a fabric of nylon polyamide fibre are entered into the bath at 20°, the bath is raised to 100° in 30 minutes and the fabric dyed for 1 hour at this temperature, with subsequent rinsing and drying. The reddish yellow dyeing thus produced is level and has good fastness properties.

The dyes listed in the following table conform to the general formula

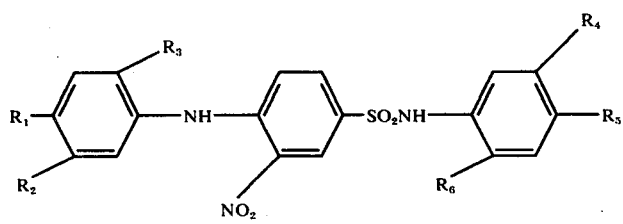

| Ex. | R₁ | R₂ | R₃ | R₄ | R₅ | R₆ | Shade on Polyester fibre |
|---|---|---|---|---|---|---|---|
| 11a | H₅C₆—N=N— | H | H | H | —Cl | H | reddish yellow |
| 11b | " | H | H | H | H | —OH | " |
| 11c | " | H | H | H | —N=N—⟨⟩—NO₂ | H | " |
| 11d | H | H | H | H | —N=N—⟨⟩—OH | H | yellow |
| 11e | Cl—⟨⟩—N=N— | H | H | H | H | H | reddish yellow |
| 11f | " | H | H | H | —N=N—⟨⟩—Cl | H | " |
| 11g | O₂N—⟨⟩—N=N— | —CH₃ | —OCH₃ | H | H | H | " |
| 12 | N≡C—⟨⟩—N=N— | —OCH₃ | H | H | H | H | " |
| 13 | H | H | H | —N=N—⟨⟩—OH | H | H | yellow |
| 14 | H | —Cl | H | H | —N=N—C₆H₅ | H | " |
| 15 | CH₃O₂S—⟨naphthyl⟩—N=N— | H | H | H | H | H | reddish yellow |
| 16 | ⟨benzothiazolyl⟩—N=N— | H | H | H | H | H | reddish yellow |
| 17 | CH₃—⟨pyrazolyl-N-cyclohexyl⟩—N=N— | H | H | H | H | H | " |
| 18 | H₅C₆—N=N— | H | H | H | —N=N—⟨⟩(OH)(CH₃) | H | " |

-continued

| Ex. | R₁ | R₂ | R₃ | R₄ | R₅ | R₆ | Shade on Polyester fibre |
|---|---|---|---|---|---|---|---|
| 19 | imidazole with CONH₂ and N=N— | H | H | —CH₃ | H | H | '' |
| 20 | O₂N—C₆H₄—N=N— | H | H | H | —N=N—C₆H₃(OH)(CH₃) | H | '' |
| 21 | H₅C₆—N=N— | —NHCO—CH₃ | H | H | H | H | reddish yellow |
| 22 | Cl-thiadiazole—N=N— | H | H | H | —N=N—thiazole—NO₂ | H | '' |
| 23 | | H | H | H | H | H | '' |
| 24 | H | H | H | H | —N=N—C₆H₄—OCH₃ | H | yellow |
| 25 | N≡C—S—C₆H₄—N=N— | H | H | H | H | H | reddish yellow |
| 26 | Br—C₆H₄—N=N— | H | H | H | H | H | '' |
| 27 | CH₃HN—SO₂—C₆H₄—N=N— | H | H | H | H | H | '' |
| 28 | CH₃CO—C₆H₄—N=N— | H | H | H | H | H | '' |
| 29 | H | H | H | H | —N=N—C₆H₄—CH₃ | H | yellow |
| 30 | H₅C₆-thiadiazole—N=N— | H | H | —CH₃ | H | H | reddish yellow |
| 31 | H | H | H | H | —N=N—CH(COCH₃)CONH—C₃H₅ | H | yellow |
| 32 | H | H | H | H | —N=N— fused bicyclic with OH and N | H | '' |
| 33 | H₅C₆—N=N— | H | H | H | —OCH₃ | H | reddish yellow |
| 34 | '' | H | H | H | H | —OCH₃ | yellow |
| 35 | '' | H | H | —OCH₃ | H | H | '' |
| 36 | '' | H | H | —OCH₃ | H | —OCH₃ | '' |
| 37 | '' | H | H | H | —OCH₃ | —OCH₃ | '' |
| 38 | '' | H | H | —CH₃ | H | H | '' |
| 39 | '' | H | H | H | —CH₃ | H | '' |

-continued

| Ex. | R₁ | R₂ | R₃ | R₄ | R₅ | R₆ | Shade on Polyester fibre |
|---|---|---|---|---|---|---|---|
| 40 | '' | H | H | H | H | —CH₃ | '' |
| 41 | '' | H | H | —Cl | H | H | '' |
| 42 | '' | H | H | H | H | —Cl | '' |
| 43 | '' | H | H | H | —OCH₂CH₂OH | H | '' |
| 44 | '' | H | H | H | —OCH₂CH₂OCOCH₃ | H | '' |
| 45 | '' | H | H | H | —CH₃ | —CH₃ | '' |
| 46 | 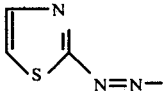 | H | H | —CH₃ | H | H | '' |
| 47 | 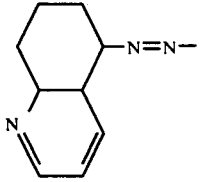 | H | H | —CH₃ | H | H | '' |
| 48 | H₅C₆—N=N— | H | H | —CH₃ | H | —CH₃ | reddish yellow |
| 49 | '' | —CH₃ | H | —CH₃ | H | H | '' |
| 50 | '' | H | H | H | Cl | —CH₃ | '' |
| 51 | '' | H | H | Cl | H | —CH₃ | '' |
| 52 | '' | H | H | H | —OCH₂CH₃ | H | '' |
| 53 | '' | H | H | —CH₃ | —CH₃ | H | '' |
| 54 | '' | H | —OCH₃ | —CH₃ | H | H | '' |
| 55 | '' | H | H | H | 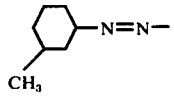 | H | '' |
| 56 | 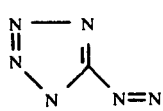 | H | —C₂H₅ | H | H | —C₂H₅ | '' |
| 57 | 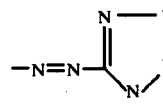 | —HNCHO | H | H | —O—C₆H₅ | H | '' |
| 58 | H₅C₆—N=N— | H | H | H | —NHCOCH₂CH₃ | H | '' |
| 59 | 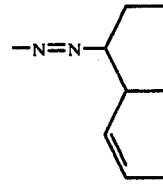 | H | H | —CH₃ | H | H | '' |
| 60 | H | H | H | H | —N=N—[tetrazole] | H | '' |
| 61 | H | H | H | H | [decahydroquinoline-N=N—] | H | reddish yellow |

-continued

| Ex. | R₁ | R₂ | R₃ | R₄ | R₅ | R₆ | Shade on Polyester fibre |
|---|---|---|---|---|---|---|---|
| 62 | H | H | H | H |  | H | " |

The dyes set forth in the following Table II conform to the formula

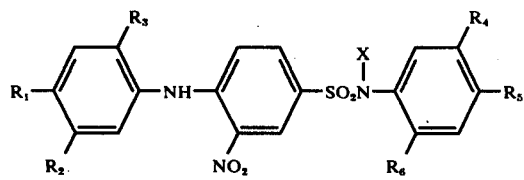

| Ex. | X | R₁ | R₂ | R₃ | R₄ | R₅ | R₆ | Shade on Polyester fibre |
|---|---|---|---|---|---|---|---|---|
| 63 | —CH₃ | H₅C₆—N≡N— | H | H | —CH₃ | H | H | reddish yellow |
| 64 | " | " | H | H | H | —CH₃ | H | " |
| 65 | " | " | H | H | H | H | —CH₃ | " |
| 66 | " | " | H | H | H | —CH₃ | " | " |
| 67 | " | " | H | H | —CH₃ | H | " | " |
| 68 | " | " | H | H | H | —Cl | " | " |
| 69 | " | " | H | H | —Cl | H | " | " |
| 70 | " | " | H | H | —OCH₃ | H | H | " |
| 71 | " | " | H | H | H | —OCH₃ | H | " |
| 72 | " | " | H | H | H | H | —OCH₃ | " |
| 73 | " | " | H | H | —OCH₃ | H | " | " |
| 74 | " | " | H | H | H | —OCH₃ | " | " |
| 75 | " | " | H | H | —Cl | H | H | " |
| 76 | " | " | H | H | H | —Cl | H | " |
| 77 | " | " | H | H | H | H | —Cl | " |
| 78 | " | " | H | H | —Br | H | H | " |
| 79 | " | " | H | H | H | —Br | H | " |
| 80 | " | " | H | H | H | H | —Br | " |
| 81 | —CH₂CH₃ | " | H | H | H | H | H | " |
| 82 | " | " | H | H | —CH₃ | H | H | " |
| 83 | —CH₂CH₂CN | " | H | H | " | H | H | " |
| 84 | —CH₂CH₂CH₃ | H₅C₆—N≡N— | H | H | —CH₃ | H | H | " |
| 85 | —CH₂CH₃ | CH₃CH₂OCONH—⟨cyclohexyl⟩—N≡N— | H | H | " | H | H | " |
| 86 | " | H | H | H | H | (phenyl-thiadiazolyl) C₆H₅ group —N≡N— | H | yellow |
| 87 | —CH₃ | H₅C₆—N≡N— | —CH₃ | H | CH₃ | H | H | reddish yellow |
| 88 | " | " | H | —OCH₃ | H | H | H | " |
| 89 | " | " | —Cl | H | H | H | H | " |
| 90 | " | " | —OCH₃ | —OCH₃ | H | H | H | " |
| 91 | " | " | —NH—COCH₃ | H | H | H | H | " |
| 92 | " | O₂N—⟨cyclohexyl⟩—N≡N— | H | H | —CH₃ | H | H | " |
| 93 | " | Cl—⟨cyclohexyl⟩—N≡N— | H | H | H | H | H | " |

-continued

| Ex. | X | $R_1$ | $R_2$ | $R_3$ | $R_4$ | $R_5$ | $R_6$ | Shade on Polyester fibre |
|---|---|---|---|---|---|---|---|---|
| 94 | " | $CH_3O_2S$-naphthyl-N=N- | H | H | $-CH_3$ | H | H | " |
| 95 | " | cyclohexyl-thiazoline-N=N- | H | H | " | H | H | " |
| 96 | $-CH_3$ | 3-methyl-1-phenyl-pyrazol-5-yl-N=N- | H | H | $-CH_3$ | H | H | " |
| 97 | " | 5-chloro-thiazol-2-yl-N=N- | H | H | " | H | H | " |
| 98 | " | 3-methyl-cyclohexyl-N=N- | $-CH_3$ | H | " | H | H | " |
| 99 | $-CH_3$ | 4-methoxy-cyclohexyl-N=N- | H | H | $-CH_3$ | H | H | " |
| 100 | " | $C_6H_5$—H=N— | H | $-CH_3$ | $-CH_3$ | H | H | " |
| 101 | " | " | H | H | H | H | H | " |
| 102 | $-CH_2CH_2-$ 2-pyridyl | " | H | H | H | H | H | " |
| 103 | $-CH_2CH_2-$ 4-pyridyl | " | H | H | H | H | H | " |
| 104 | $-CH_2CH_2-$ 2-methyl-5-pyridyl | " | H | H | H | H | H | " |
| 105 | $-CH_2CH_2COOCH_3$ | " | H | H | H | H | H | " |
| 106 | $-CH_2CH_2OCOCH_3$ | " | H | H | H | H | H | " |
| 107 | $-CH_2CH_2-$ $OCOOCH_3$ | " | H | H | H | H | H | " |
| 108 | $-CH_2CH_2Cl$ | " | H | H | H | H | H | " |
| 109 | $-CH_2CH_2-$ $OCO-C_6H_5$ | " | H | H | H | H | H | " |
| 110 | $-CH_3$ | $-Cl$ | H | H | H | $-N=N-C_6H_5$ | H | yellow |
| 111 | $-CH_2CH_2OCOCH_3$ | H | H | H | H | $-N=N-$(4-chlorocyclohexyl) | H | " |
| 112 | $-CH_3$ | $H_5C_6-N=N-$ | H | H | H | $-N=N-C_6H_5$ | H | reddish yellow |
| 113 | $-CH_2CH_2CH_3$ | " | H | H | $-CH_3$ | H | H | " |
| 114 | $-CH_2CH_2CH_2CH_3$ | " | H | H | " | H | H | " |

-continued

| Ex. | X | R₁ | R₂ | R₃ | R₄ | R₅ | R₆ | Shade on Polyester fibre |
|---|---|---|---|---|---|---|---|---|
| 115 | —CH₂CH₃ | H₅C₆—N=N— | H | H | H | H | —CH₂—CH₃ | " |
| 116 | " | " | H | H | H | —NO₂ | H | " |
| 117 | " | " | H | H | H | —CN | H | " |
| 118 | " | H | Br | H | H | imidazole-CONH₂ with N=N— | H | yellow |
| 119 | —CH₂CH₂Cl | cyclohexyl(CH₂CH₃)—N=N— | H | H | H | —S—C≡N | H | reddish yellow |
| 120 | —CH₂CH₂—COOCH₂CH₃ | C₆H₅—O—C₆H₄—N=N— | —CH₃ | H | H | —O—CH₂CH₂OCO—CH₂CH₃ | H | " |
| 121 | —CH₂—C₆H₅ | CH₃CH₂—O—C₆H₄—N=N— | —CH₃ | —CH₃ | —CH₃ | H | H | " |
| 122 | —CH₂—CH(Cl)—CH₃ | H₅C₆—O—C₆H₄—N=N— | " | H | H | —SO₂CH₃ | H | " |
| 123 | —CH₂CH₂CH | CH₃CH₂O₂S—C₆H₄—N=N— | " | H | H | —SO₂CH₂CH₃ | H | " |
| 124 | —CH₂—CH(CH(CH₃))—CH₃ | HOCH₂CH₂O₂S—C₆H₄—N=N— | " | H | CH₃ | H | H | " |
| 125 | —CH₂—CH(CN)—CH₃ | H₂NO₂S—C₆H₄—N=N— | CH₃ | H | CH₃ | H | H | " |
| 126 | —CH₂CH₂—OCOCH₂CH₃ | (CH₃)₂NO₂S—C₆H₄—N=N— | H | H | " | —SO₂NH₂ | H | " |
| 127 | —CH₂CH₂—OCOOCH₂CH₃ | CH₃CH₂NHO₂S—C₆H₃(Cl)—N=N— | H | H | " | H | H | " |
| 128 | —CH₂CH₂CONH₂ | (CH₃CH₂)₂NO₂S—C₆H₄—N=N— | H | H | " | H | H | " |
| 129 | —CH₂CH₂—OCOOCH₂C₆H₅ | N≡C—CH₂CH₂NHO₂S—C₆H₄—N=N— | H | H | " | H | H | " |
| 130 | —CH₂CH₂OCH₃ | (N≡C—CH₂CH₂)₂NO₂—C₆H₃(S)—N=N— | H | H | " | —CH₃ | H | " |
| 131 | —CH₂CH₂OCH₂CH₃ | HOCH₂CH₂NHO₂S—C₆H₄—N=N— | H | H | " | H | H | " |

-continued

| Ex. | X | R₁ | R₂ | R₃ | R₄ | R₅ | R₆ | Shade on Polyester fibre |
|---|---|---|---|---|---|---|---|---|
| 132 | —CH₂CH₂—O—C₆H₅ | (HOCH₂CH₂)₂NO₂S—C₆H₄—N=N— | H | H | " | H | H | " |
| 133 | —CH₂—CH(CH₃)—O—CH₃ | H₅C₆—NHO₂S—C₆H₄—N=N— | H | H | " | H | —CH₃ | " |
| 134 | —CH₂—CH(CH₃)—O—CH₂CH₃ | HOC—C₆H₄—N=N— | H | H | " | H | H | " |
| 135 | —CH₂CH₃ | OHCHN—C₆H₄—N=N— | H | H | CH₃ | H | H | " |
| 136 | —CH₂CH₃ | CH₃CONH—C₆H₄—N=N— | H | H | CH₃ | H | H | " |
| 137 | —CH₂—CH₂—CH₃ | CH₃CH₂CONH—C₆H₄—N=N— | H | H | " | H | H | " |
| 138 | —CH₂CH₂OCOCH₃ | H₅C₆—CONH—C₆H₄—N=N— | H | H | H | —SO₂CH₂—C₆H₅ | H | " |
| 139 | —CH₂CH₃ | CH₃O—CO—C₆H₄—N=N— | —NH—COC₂H₅ | H | CH₃ | H | H | orange |
| 140 | —CH₃ | CH₃CH₂—O—CO—C₆H₄—N=N— | H | H | " | H | H | reddish yellow |
| 141 | —CH₂CH₃ | ClCH₂CH₂CONH—C₆H₄—N=N— | H | H | " | H | H | " |
| 142 | —CH₂CH₂—OCON(CH₃)₂ | Br-thiazole-N=N— | H | H | " | H | H | " |
| 143 | —CH₂CONH₂ | CH₃O-thiazole-N=N— | H | H | " | H | H | " |
| 144 | —CH₂CH₃ | H₃C-thiazole-N=N— | H | H | " | H | H | " |
| 145 | —CH₂CH₃ | N≡C-thiazole-N=N— | H | H | H | H | —OCH₃ | " |
| 146 | CH₂CH₂—OCONH—C₆H₅ | O₂N-thiazole-N=N— | H | H | CH₃ | H | H | " |

-continued

| Ex. | X | R₁ | R₂ | R₃ | R₄ | R₅ | R₆ | Shade on Polyester fibre |
|---|---|---|---|---|---|---|---|---|
| 147 | —CH₂CH₃ | (thiazole with F₃C, S, N=N—) | H | H | " | H | H | " |
| 148 | —CH₂CH₃ | (thiazole with CH₃O₂S, S, N=N—) | H | H | " | H | H | " |
| 149 | —CH₂CH₂OCOCH₃ | (benzothiazole with Cl, S, N=N—) | H | H | H | —Cl | H | " |
| 150 | —CH₂CH₂CONH₂ | (benzothiazole with Br, S, N=N—) | H | H | H | H | —OCH₃ | " |
| 151 | —CH₂CH₃ | (benzothiazole with O₂N, S, N=N—) | H | H | H | —SO₂NHCH₃ | H | " |
| 152 | " | (benzothiazole with N≡C, S, N=N—) | H | H | H | —CH₃ | —CH₃ | " |
| 153 | " | (benzothiazole with CH₃O, S, N=N—) | H | H | H | —SO₂NHCH₂CH₃ | H | " |
| 154 | " | (benzothiazole with CF₃, S, N=N—) | H | H | H | —SO₂NHCH₂CH₂—CH₂OCH₃ | H | " |
| 155 | " | (benzothiazole with CH₃O₂S, S, N=N—) | H | H | H | —SO₂N(CH₃)₂ | H | " |
| 156 | " | (benzothiazole with H₂NO₂S, S, N=N—) | H | H | H | —SO₂N(CH₂CH₃)₂ | H | " |
| 157 | —CH₂CH₃ | (benzothiazole with CH₃HNO₂S, S, N=N—) | H | H | CH₃ | H | H | " |
| 158 | " | (benzothiazole with (CH₃)₂NO₂S, S, N=N—) | H | H | " | H | H | " |

-continued

| Ex. | X | R₁ | R₂ | R₃ | R₄ | R₅ | R₆ | Shade on Polyester fibre |
|---|---|---|---|---|---|---|---|---|
| 159 | " | ![structure with cyclohexane fused thiazoline, CH₃CH₂HNO₂S substituent, N=N−] | H | H | " | H | " | " |
| 160 | " | ![structure with cyclohexane fused thiazoline, (CH₃CH₂)₂NO₂S substituent, N=N−] | H | H | " | H | " | " |
| 161 | " | ![structure with cyclohexane fused thiazoline, (HOCH₂CH₂)₂NO₂S substituent, N=N−] | H | H | " | H | " | " |
| 162 | H | −Cl | H | H | −CH₃ | −N=N−⟨Br⟩ | H | " |
| 163 | −CH₃ | ![thiophene-N=N−] | H | H | " | H | H | " |
| 164 | −CH₂CH₃ | −Br | H | H | −NH−CHO | −N=N−⟨CN⟩ | H | " |
| 165 | " | H | H | H | −NH−CO−C₆H₅ | −N=N−⟨CH₂CH₃⟩ | H | " |
| 166 | " | −OHCO−C₆H₅ | H | H | −CH₃ | −N=N−⟨OCH₂CH₃⟩ | H | " |
| 167 | " | −NHCOOCH₃ | H | H | " | −N=N−⟨S−CHN⟩ | H | " |
| 168 | −CH₂CH₂OCH₃ | H | −CH₃ | H | " | −N=N−⟨C−C₆H₅⟩ | H | " |
| 169 | −CH₂CH₂OCOCH₃ | H | " | H | " | −N=N−⟨CH₃⟩ | H | " |
| 170 | −CH₂CH₂OCOCH₃ | H | −Cl | H | −CH₃ | −N=N−⟨COCH₃⟩ | H | yellow |
| 171 | −CH₂CH₃ | −NHCOOCH₂CH₃ | H | H | " | −N=N−⟨CO−C₆H₅⟩ | H | " |
| 172 | " | −NHCOOCH₂−C₆H₅ | H | H | " | −N=N−⟨SO₂CH₃⟩ | H | " |
| 173 | " | −NHCOCH₂CH₂Cl | H | H | " | −N=N−⟨SO₂CH₂CH₃⟩ | H | " |

-continued

| Ex. | X | R₁ | R₂ | R₃ | R₄ | R₅ | R₆ | Shade on Polyester fibre |
|---|---|---|---|---|---|---|---|---|
| 174 | " | H | Br | H | " | $-N=N-\text{C}_6\text{H}_4-\text{SO}_2\text{N}(\text{CH}_3)_2$ | H | " |
| 175 | " | Br | H | H | " | $-N=N-\text{C}_6\text{H}_4-\text{SO}_2\text{CH}_2\text{CH}_2\text{OH}$ | H | " |
| 176 | " | Cl | H | H | " | $-N=N-\text{C}_6\text{H}_4-\text{SO}_2\text{NH}_2$ | H | " |
| 177 | " | H | Cl | H | H | $-N=N-\text{C}_6\text{H}_4-\text{SO}_2\text{NHCH}_3$ | H | " |
| 178 | " | H | H | H | H | $-N=N-\text{C}_6\text{H}_4-\text{SO}_2\text{NHC}_2\text{H}_5$ | H | " |
| 179 | " | H | H | H | H | $-N=N-\text{C}_6\text{H}_4-\text{SO}_2\text{N}(\text{C}_2\text{H}_5)_2$ | H | " |
| 180 | " | H | CH₃ | H | —CH₃ | $-N=N-\text{C}_6\text{H}_3(\text{Cl})-\text{NO}_2$ | H | " |
| 181 | —CH₂CH₃ | H | H | H | H | $-N=N-\text{C}_6\text{H}_4-\text{SO}_2\text{NHCH}_2\text{CH}_2\text{CN}$ | H | " |
| 182 | " | H | —CH₃ | H | —CH₃ | $-N=N-\text{C}_6\text{H}_4-\text{SO}_2\text{N}(\text{CH}_2\text{CH}_2\text{CN})_2$ | H | " |
| 183 | " | H | H | H | " | $-N=N-\text{C}_6\text{H}_3(\text{Cl})-\text{SO}_2\text{NHCH}_2\text{CH}_2\text{CH}$ | H | reddish yellow |
| 184 | H | H | H | H | " | $-N=N-\text{C}_6\text{H}_4-\text{SO}_2\text{N}(\text{CH}_2\text{CH}_2\text{CH}_3)_2$ | H | yellow |
| 185 | H | H | H | H | " | $-N=N-\text{C}_6\text{H}_4-\text{SO}_2\text{NH}-\text{C}_6\text{H}_5$ | H | " |
| 186 | —CH₃ | H | H | H | " | $-N=N-\text{C}_6\text{H}_4-\text{CHO}$ | H | " |
| 187 | —CH₂CH₃ | H | H | H | H | $-N=N-\text{C}_6\text{H}_3(\text{NHCHO})-$ | —OCH₃ | " |
| 188 | —CH₂CH₂OCOCH₃ | H | H | H | —CH₃ | $-N=N-\text{C}_6\text{H}_4-\text{NHCOCH}_3$ | H | " |
| 189 | —CH₂CH₂—OCOCH₂CH₃ | H | H | H | " | $-N=N-\text{C}_6\text{H}_4-\text{NHCOCH}_2\text{CH}_3$ | H | " |

-continued

| Ex. | X | R₁ | R₂ | R₃ | R₄ | R₅ | R₆ | Shade on Polyester fibre |
|---|---|---|---|---|---|---|---|---|
| 190 | —CH₂CH₂—OCO—C₆H₅ | H | H | H | " | —N=N—⟨⟩—NHCO—C₆H₅ | H | " |
| 191 | —CH₂CH₃ | H | H | H | " | —N=N—⟨⟩—NHCOCH₂Cl | H | " |
| 192 | —CH₂CH₃ | H | H | H | H | —N=N—⟨⟩—COOCH₃ | H | " |
| 193 | H | H | H | H | —CH₃ | —N=N—⟨⟩—COOCH₂CH₃ | H | " |
| 194 | —CH₂CH₃ | H | H | H | " | —N=N—⟨⟩—COOCH₂C₆H₅ | H | " |
| 195 | " | H | —CH₃ | H | " | —N=N—⟨⟩—NHCOOCH₃ | H | " |
| 196 | " | H | H | H | " | —N=N—⟨⟩—NHCOOCH₂CH₃ | H | " |
| 197 | " | CH₃OCONH—⟨⟩—N=N— | H | H | " | H | H | reddish yellow |
| 198 | H | H₅C₆—CH₂O—C(=O)—⟨⟩—N=N— | H | H | " | H | H | " |
| 199 | H | Cl | H | H | H | —N=N—⟨⟩—N(CH₃)₂ | H | " |
| 200 | H | H | Cl | H | H | —N=N—⟨⟩—N(CH₂CH₃)₂ | H | " |
| 201 | H | Br | H | H | H | —N=N—⟨⟩—N(CH₂CH₃)(CH₂CH₂CN) | H | " |
| 202 | H | H | H | H | H | —N=N—⟨⟩—N(CH₂CH₂OH)₂ | H | " |
| 203 | H | Cl | —CH₃ | H | H | —N=N—⟨⟩—N(CH₂CH₂CN)₂ | H | yellow |
| 204 | H | Cl | H | H | H | —N=N—C(CH₃)=C(OH)—C(NH)=N | H | " |

-continued

| Ex. | X | R₁ | R₂ | R₃ | R₄ | R₅ | R₆ | Shade on Polyester fibre |
|---|---|---|---|---|---|---|---|---|
| 205 | H | Cl | H | H | H | ![azo-pyridazinone group with CH₃, CH₃, OH, N-C₆H₅] | H | " |
| 206 | —CH₂CH₃ | H | H | H | —CH₃ | —N=N—⟨cyclohexyl⟩—CONH₂ | H | " |
| 207 | " | CH₃NH—C(O)—⟨cyclohexyl⟩—N=N— | H | H | " | H | H | reddish yellow |
| 208 | " | (CH₃)₂N—C(O)—⟨cyclohexyl⟩—N=N— | H | H | " | H | H | " |
| 209 | " | CH₃CH₂HN—C(O)—⟨cyclohexyl⟩—N=N— | —CH₃ | H | " | H | H | " |
| 210 | " | (CH₃CH₂)₂N—C(O)—⟨cyclohexyl⟩—N=N— | H | H | " | H | H | " |
| 211 | " | H₅C₆—NH—C(O)—⟨cyclohexyl⟩—N=N— | —CH₃ | H | " | H | H | " |
| 212 | —CH₃ | H | H | H | " | —N=N—⟨cyclohexyl⟩—CONHCH₃ | H | yellow |
| 213 | H | H | H | H | " | —N=N—⟨cyclohexyl⟩—CONHCH₂CH₃ | H | " |
| 214 | H | H | H | H | —CH₃ | —N=N—⟨cyclohexyl⟩—CON(CH₃)₂ | H | " |
| 215 | H | H | H | H | " | —N=N—⟨cyclohexyl⟩—CON(CH₂CH₃)₂ | H | " |
| 216 | H | H | —Cl | H | " | —N=N—⟨cyclohexyl⟩—CONH—C₆H₅ | H | " |
| 217 | H | Cl | H | H | H | —N=N—⟨pyrazole with H₂N, N-C₆H₅⟩ | H | " |

| Ex. | X | R₁ | R₂ | R₃ | R₄ | R₅ | R₆ | Shade on Polyester fibre |
|---|---|---|---|---|---|---|---|---|
| 218 | H | H | H | H | H | (pyrazole-CH₃, N-C₆H₅, NH₂ azo group) | H | " |
| 219 | H | H | H | Cl | H | (pyrazole, N-CH₂CH₃ azo group) | H | " |
| 220 | H | H | H | H | H | (pyrazole-NH₂, N-CH(CH₃)₂ azo group) | H | " |
| 221 | H | H | H | Cl | H | (pyrazole, N-CH₂-C₆H₅ azo group) | H | " |
| 222 | —CH₂CH₃ | H₅C₆—N=N— | H | H | H | —SO₂—C₆H₅ | H | reddish yellow |
| 223 | CH₂CH₃ | H₅C₆—N=N— | H | H | H | —SO₂N(CH₃)₂ | H | " |
| 224 | " | " | —CH₃ | H | H | —SO₂N(CH₂CH₃)₂ | H | " |
| 225 | " | " | " | H | H | —COCH₃ | H | " |
| 226 | —CH₃ | " | " | H | H | —CO—C₆H₅ | H | " |
| 227 | " | " | " | H | H | —CONH₂ | H | " |
| 227a | " | " | " | H | H | —CONHCH₃ | H | " |
| 228 | CH₂CH₃ | " | H | H | H | —CON(CH₃)₂ | H | " |
| 229 | " | " | H | H | H | —CONHCH₂CH₃ | H | " |
| 230 | " | " | H | H | H | —CON(CH₂CH₃)₂ | H | " |
| 231 | —CH₂CH₂CH₃ | " | H | H | H | —CONHCH₂CH₂CH₂OCH₃ | H | " |

The dyes defined in the following Table III conform to the general formula

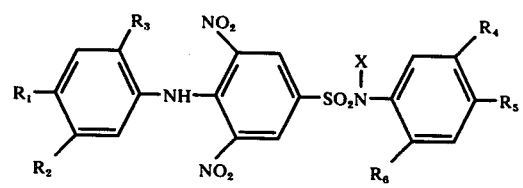

| Ex. | X | R₁ | R₂ | R₃ | R₄ | R₅ | R₆ | Shade on Polyester fibre |
|---|---|---|---|---|---|---|---|---|
| 232 | —CH₂CH₃ | H₅C₆—N=N— | H | H | H | H | H | reddish yellow |
| 233 | " | " | —CH | H | CH₃ | H | H | " |
| 234 | " | " | H | H | H | —OCH₃ | —OCH₃ | " |
| 235 | H | " | H | H | H | H | H | " |
| 236 | H | Cl | H | H | H | —N=N—C₆H₅ | H | yellow |
| 237 | —CH₂CH₃ | Br | H | H | —CH₃ | " | H | " |
| 238 | " | H | Br | H | " | " | H | " |

-continued

| Ex. | X | R₁ | R₂ | R₃ | R₄ | R₅ | R₆ | Shade on Polyester fibre |
|---|---|---|---|---|---|---|---|---|
| 239 | " | H | Cl | H | H | —N=N—⟨⟩—Cl | H | " |
| 240 | " | H₅C₆—N=N— | H | —OCH₃ | —CH₃ | H | H | reddish yellow |
| 241 | —CH₂CH₂OCOCH₃ | " | H | H | H | H | H | " |
| 242 | H | " | H | H | —OCH₃ | H | H | " |
| 243 | H | " | H | H | H | H | —OCH₃ | " |
| 244 | —CH₂CH₃ | O₂N—⟨⟩—N=N— | H | H | —CH₃ | H | H | " |
| 245 | " | " | H | H | H | —OCH₂CH₂OCOCH₃ | H | " |
| 246 | —CH₂CH₂CH | Cl—⟨⟩—N=N— | —CH₃ | H | —CH₃ | H | H | reddish yellow |
| 247 | —CH₂CH₃ | H₅C₆—CH₂C₂S—⟨⟩—N=N— | H | H | " | H | H | " |
| 248 | " | H | H | H | H | —N=N—⟨⟩—CH₃ (Cl, —SC₂CH₂C₆H₅) | H | " |
| 249 | " | CH₃SO₂HN—⟨⟩—N=N— | H | H | CH₃ | H | H | " |
| 250 | " | H | H | H | H | —N=N—⟨⟩—NHSO₂CH₃ | H | yellow |
| 251 | " | H₂NCO—⟨⟩—N=N— | H | H | —CH₃ | H | H | reddish yellow |

Formulae of especially preferred dyes of the foregoing Examples are as follows:

Example 2

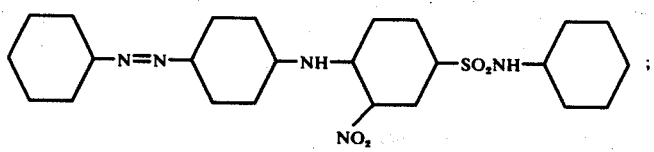

Example 3

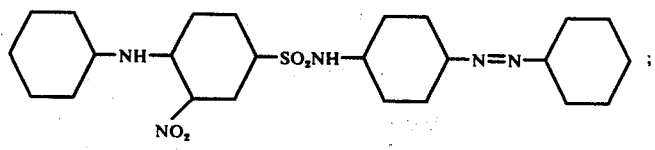

Example 9

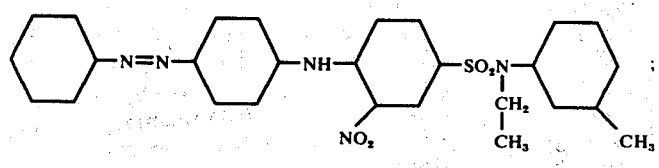

Example 10

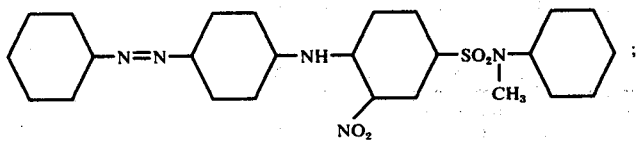

Example 34

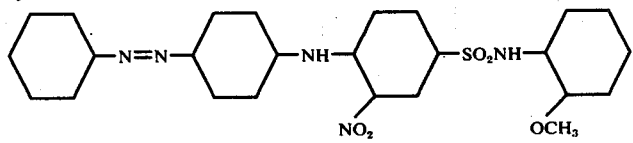

Example 37

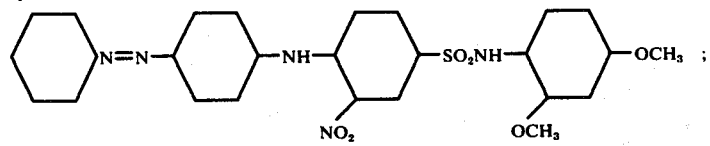

Example 38

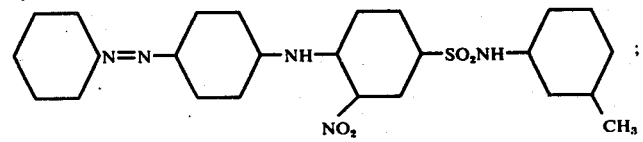

Example 81

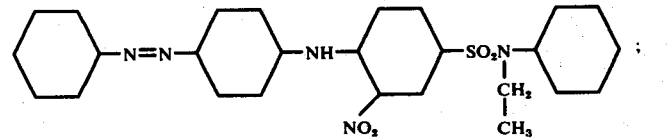

Having thus disclosed the invention, what we claim is:

1. A mixture of at least two compounds of the formula

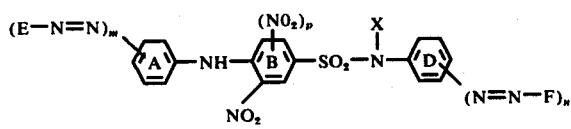

wherein

E is phenyl, substituted phenyl, naphthyl or methylsulfonylnaphthyl, wherein each substituent of substituted phenyl is independently chloro, bromo, lower alkyl, lower alkoxy, trifluoromethyl, nitro, cyano, thiocyano, phenoxy, formyl, acetyl, benzoyl, lower alkylsulfonyl, lower hydroxyalkylsulfonyl, benzylsulfonyl, sulfamoyl, lower alkylsulfamoyl, cyanoethylsulfamoyl, hydroxyethylsulfamoyl, dilower alkylsulfamoyl, N,N-di(cyanoethyl)sulfamoyl, N,N-di(hydroxyethyl)sulfamoyl, phenylsulfamoyl, formamido, lower alkanoylamino, chloropropionamido, benzamido, lower alkylsulfonylamino, lower alkoxycarbonyl, benzyloxycarbonyl, lower alkoxycarbonylamino, carbamoyl, lower alkylcarbamoyl, dilower alkylcarbamoyl or phenylcarbamoyl, F is phenyl, substituted phenyl, naphthyl or methylsulfonylnaphthyl, wherein each substituent of substituted phenyl is independently chloro, bromo, lower alkyl, lower alkoxy, phenoxy, trifluoromethyl, thiocyano, cyano, nitro, hydroxy, formyl, acetyl, benzoyl, lower alkylsulfonyl, hydroxyethylsulfonyl, benzylsulfonyl, sulfamoyl, lower alkylsulfamoyl, cyanoethylsulfamoyl, hydroxyethylsulfamoyl, dilower alkylsulfamoyl, N,N-dicyanoethyl)sulfamoyl, N,N-di(-hydroxyethyl)sulfamoyl, phenylsulfamoyl, lower alkylamino, cyanoethylamino, dilower alkylamino, N,N-di(cyanoethyl)amino, N-ethyl-N-cyanoethylamino, N,N-di(hydroxyethyl)amino, formamido, lower alkanoylamino, chloropropionamido, benzamido, methylsulfonylamino, lower alkoxycarbonyl, benzyloxycarbonyl, lower alkoxycarbonylamino, carbamoyl, lower alkylcarbamoyl, dilower alkylcarbamoyl or phenylcarbamoyl, X is hydrogen, lower alkyl or substituted lower alkyl wherein each substituent is independently chloro, bromo, hydroxy, cyano, lower alkanoyloxy, benzoyloxy, lower alkoxycarbonyloxy, lower alkoxycarbonyl, carbamoyl, benzyloxycarbonyloxy, lower alkoxy, phenoxy, phenyl, methylcarbamoyloxy, dimethylcarbamoyloxy or phenylcarbamoyloxy, Ring A is further unsubstituted or further substituted, with the proviso that each further substituent on Ring A is independently chloro, bromo, lower alkyl, lower alkoxy, formamido, lower alkanoylamino, benzamido, lower alkoxycarbonylamino, benzyloxycarbonylamino or chloropropionamido, Ring D is further unsubstituted or further substituted, with the proviso that each further substituent on Ring D is independently chloro, bromo, lower alkyl, lower alkoxy, phenoxy, hydroxy, cyano, nitro, thiocyano, hydroxyethoxy, lower alkanoyloxyethoxy, formamido, lower alkanoylamino, benzamido, lower alkylsulfonyl, benzylsulfonyl, phenylsulfonyl, sulfamoyl, lower alkylsulfamoyl, methoxypropylsulfamoyl, dilower alkylsulfamoyl, acetyl, benzoyl, carbamoyl, lower alkylcarbamoyl, dilower alkylcarbamoyl or methoxypropylcarbamoyl, $m$ is 1 or 1, $n$ is 0 or 1, with the proviso that m + n is 1, and $p$ is 0 or 1.

2. A mixture according to claim 1 of at least two compounds of the formula

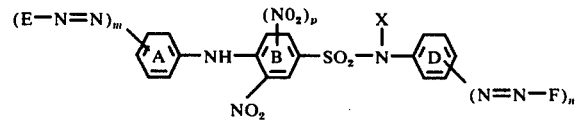

wherein

E is phenyl, substituted phenyl having 1 or 2 substituents, naphthyl or methylsulfonylnaphthyl, wherein each substituent of substituted phenyl is independently chloro, bromo, lower alkyl, lower alkoxy, trifluoromethyl, nitro, cyano, thiocyano, phenoxy, formyl, acetyl, benzoyl, lower alkylsulfonyl, lower hydroxyalkylsulfonyl, benzylsulfonyl, sulfamoyl, lower alkylsulfamoyl, cyanoethylsulfamoyl, hydroxyethylsulfamoyl, dilower alkylsulfamoyl, N,N-di(cyanoethyl)sulfamoyl, N,N-di(hydroxyethyl)sulfamoyl, phenylsulfamoyl, formamido, lower alkanoylamino, chloropropionamido, benzamido, lower alkylsulfonylamino, lower alkoxycarbonyl, benzyloxycarbonyl, lower alkoxycarbonylamino, carbamoyl, lower alkylcarbamoyl, dilower alkylcarbamoyl or phenylcarbamoyl, F is phenyl, substituted phenyl having 1 or 2 substituents, naphthyl or methylsulfonylnaphthyl, wherein each substituent of substituted phenyl is independently chloro, bromo, lower alkyl, lower alkoxy, phenoxy, trifluoromethyl, thiocyano, cyano, nitro, hydroxy, formyl, acetyl, benzoyl, lower alkylsulfonyl, hydroxyethylsulfonyl, benzylsulfonyl, sulfamoyl, lower alkylsulfamoyl, cyanoethylsulfamoyl, hydroxyethylsulfamoyl, dilower alkylsulfamoyl, N,N-di(cyanoethyl)sulfamoyl, N,N-di(hydroxyethyl)sulfamoyl, phenylsulfamoyl, lower alkylamino, cyanoethylamino, dilower alkylamino, N,N-di(cyanoethyl)amino, N-ethyl-N-cyanoethylamino, N,N-di(hydroxyethyl)amino, formamido, lower alkanoylamino, chloropropionamido, benzamido, methylsulfonylamino, lower alkoxycarbonyl, benzyloxycarbonyl, lower alkoxycarbonylamino, carbamoyl, lower alkylcarbamoyl, dilower alkylcarbamoyl or phenylcarbamoyl, X is hydrogen, lower alkyl or lower alkyl monosubstituted by chloro, bromo, hydroxy, cyano, lower alkanoyloxy, benzoyloxy, lower alkoxycarbonyloxy, lower alkoxycarbonyl, carbamoyl, benzyloxycarbonyloxy, lower alkoxy, phenoxy, phenyl, methylcarbamoyloxy, dimethylcarbamoyloxy or phenylcarbamoyloxy, Ring A is further unsubstituted or further substituted by one or two substituents, with the proviso that each further substituent on Ring A is independently chloro, bromo, lower alkyl, lower alkoxy, formamido, lower alkanoylamino, benzamido, lower alkoxycarbonylamino, benzyloxycarbonylamino or chloropropionamido, Ring D is further unsubstituted or further substituted by one or two substituents, with the proviso that each further substituent on Ring D is independently chloro, bromo, lower alkyl, lower alkoxy, phenoxy, hydroxy, cyano, nitro, thiocyano, hydroxyethoxy, lower alkanoyloxyethoxy, formamido, lower alkanoylamino, benzamido, lower alkylsulfonyl, benzylsulfonyl, phenylsulfonyl, sulfamoyl, lower alkylsulfamoyl, methoxypropylsulfamoyl, dilower alkylsulfamoyl, acetyl, benzoyl, carbamoyl, lower alkylcarbamoyl, dilower alkylcarbamoyl or methoxypropylcarbamoyl, $m$ is 0 or 1, $n$ is 0 or 1, with the proviso that $m + n$ is 1, and $p$ is 0 or 1.

3. A mixture according to claim 1 wherein

E is phenyl, substituted phenyl, naphthyl or methylsulfonylnaphthyl, wherein each substituent of substituted phenyl is independently chloro, bromo, lower alkyl, lower alkoxy, trifluoromethyl, nitro, cyano, thiocyano, phenoxy, formyl, acetyl, benzoyl, lower alkylsulfonyl, lower hydroxyalkylsulfonyl, benzylsulfonyl, sulfamoyl, methylsulfamoyl, cyanoethylsulfamoyl, hydroxyethylsulfamoyl, phenylsulfamoyl, formamido, lower alkanoylamino, chloropropionamido, lower alkylsulfonylamino, lower alkoxycarbonyl, benzyloxycarbonyl, lower alkoxycarbonylamino, carbamoyl, lower alkylcarbamoyl or phenylcarbamoyl, F is phenyl, substituted phenyl, naphthyl or methylsulfonylnaphthyl, wherein each substituent of substituted phenyl is independently chloro, bromo, lower alkyl, lower alkoxy, phenoxy, trifluoromethyl, thiocyano, cyano, nitro, hydroxy, formyl, acetyl, benzoyl, lower alkylsulfonyl, hydroxyethylsulfonyl, benzylsulfonyl, sulfamoyl, lower alkylsulfamoyl, cyanoethylsulfamoyl, hydroxyethylsulfamoyl, phenylsulfamoyl, lower alkylamino, cyanoethylamino, formamido, lower alkanoylamino, chloropropionamido, methylsulfonylamino, lower alkoxycarbonyl, benzyloxycarbonyl, lower alkoxycarbonylamino, carbamoyl, lower alkylcarbamoyl or phenylcarbamoyl, X is hydrogen, lower alkyl or substituted lower alkyl wherein each substituent is independently chloro, bromo, hydroxy, cyano, lower alkanoyloxy, benzoyloxy, lower alkoxycarbonyloxy, lower alkoxycarbonyl, carbamoyl, benzyloxycarbonyloxy, lower alkoxy, phenoxy, methylcarbamoyloxy or phenylcarbamoyloxy, Ring A is further unsubstituted or further substituted, with the proviso that each further substituent on Ring A is independently chloro, bromo, lower alkyl, lower alkoxy, formamido, lower alkanoylamino, benzamido, loer alkoxycarbonylamino, benzyloxycarbonylamino or chloropropionamido, Ring D is further unsubstituted or further substituted, with the proviso that each further substituent on on Ring D is independently chloro, bromo, lower alkyl, lower alkoxy, phenoxy, hydroxy, cyano, nitro, thiocyano, hydroxyethoxy, lower alkanoyloxyethoxy, formamido, lower alkanoylamino, benzamido, lower alklylsulfonyl, benzylsulfonyl, phenylsulfonyl, sulfamoyl, lower alkylsulfamoyl, acetyl, benzoyl, carbamoyl, lower alkylcarbamoyl or methoxypropylcarbamoyl, m is 0 or 1,
n is 0 or 1, with the proviso that m + n is 1, and
p is 0 or 1.

4. A mixture according to claim 3 of two or three compounds of the formula

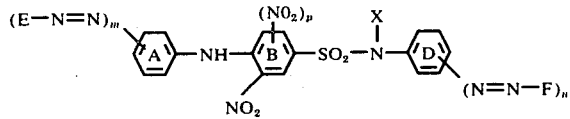

5. A mixture according to claim 4

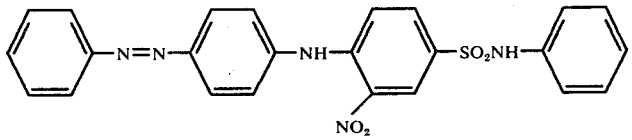

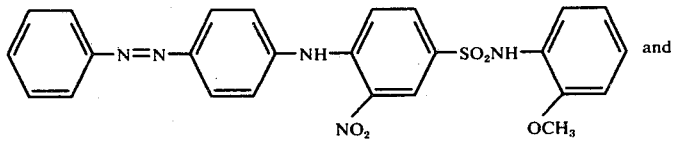

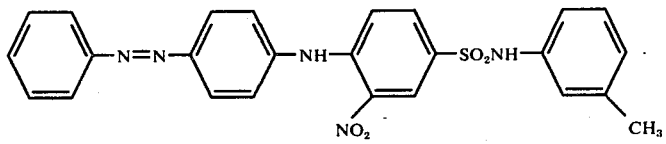

6. A mixture according to claim 4 of two compounds of the formula

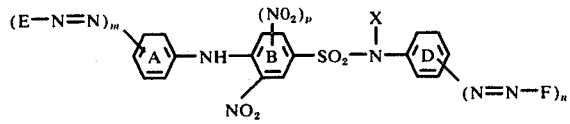

7. A mixture according to claim 6 of

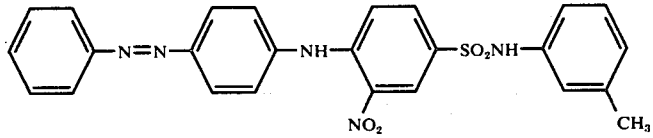

and

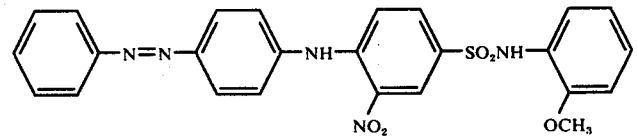

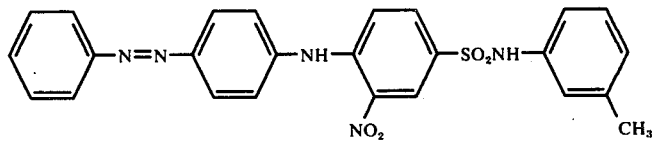

and
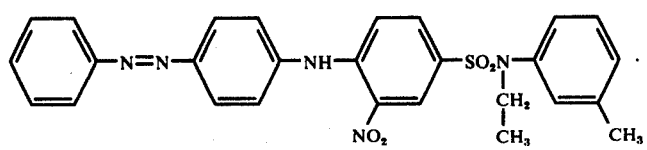

8. A mixture according to claim 6 of